(No Model.)
J. A. HOUSE.
APPARATUS FOR SHAPING CORSETS.
No. 318,256. Patented May 19, 1885.
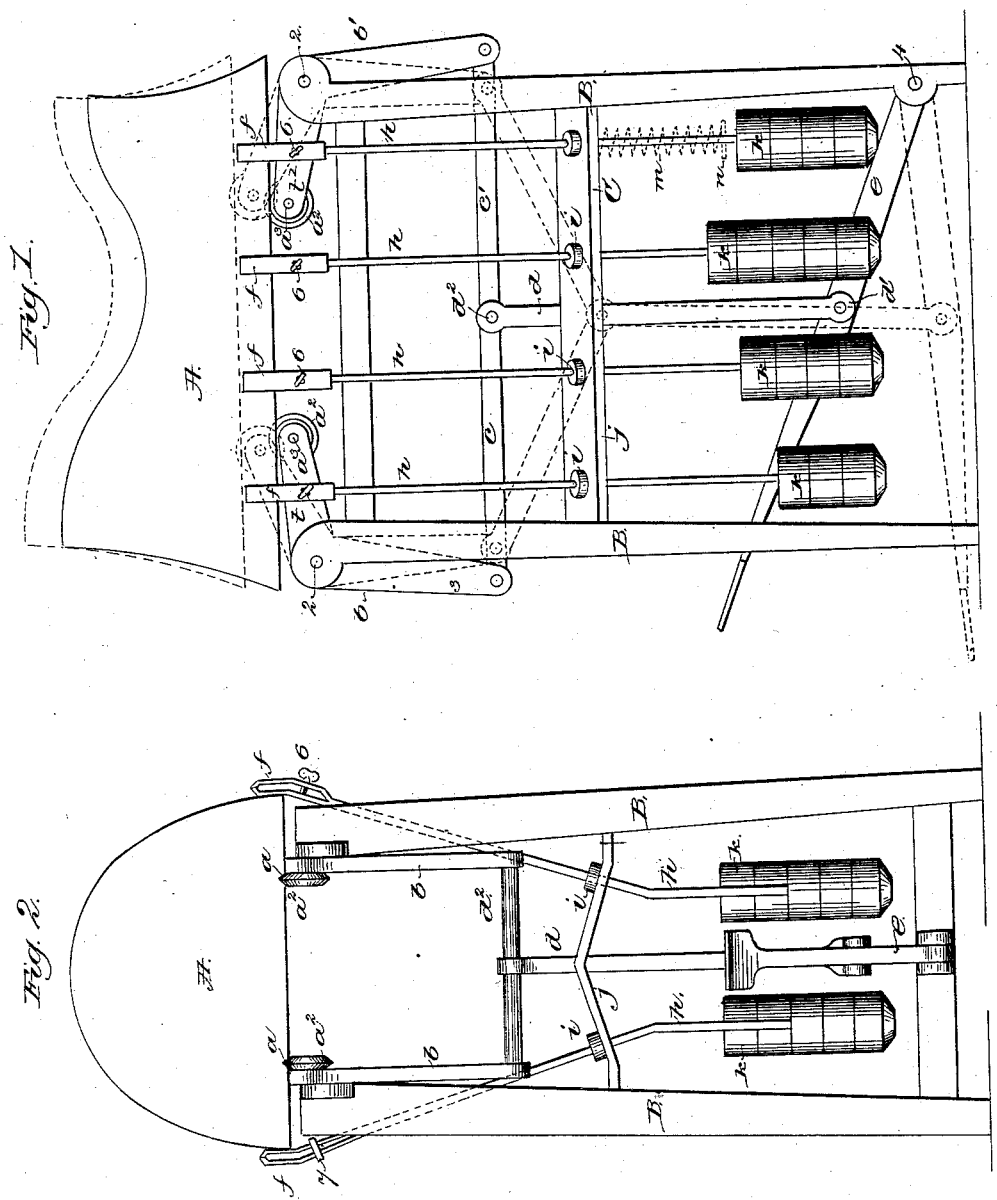

UNITED STATES PATENT OFFICE.

JAMES ALFORD HOUSE, OF BRIDGEPORT, CONNECTICUT.

APPARATUS FOR SHAPING CORSETS.

SPECIFICATION forming part of Letters Patent No. 318,256, dated May 19, 1885.

Application filed July 16, 1883. (No model.)

*To all whom it may concern:*

Be it known that I, JAMES A. HOUSE, of Bridgeport, county of Fairfield, State of Connecticut, have invented an Improvement in Apparatus for Shaping Corsets, of which the following description, in connection with the accompanying drawings, is a specification, like letters on the drawings representing like parts.
In the invention herein described the form over which the corset is held by the clamps which engage it at its edges is supported or acted upon at two or more points between its ends by arms or supports connected with a shaft, which, when turned, move the form and crowd it snugly into the corset held by the clamps or holding devices employed to grasp its edges. As herein shown, the form rests loosely upon anti-friction rollers at the ends of the said arms or supports, said rollers entering longitudinal recesses or spaces at the back of the form, the said rollers at the same time acting as guides to prevent lateral movement of the form. In connection with the said arms or supports and the shaft or axes carrying them are other arms, with which are suitably connected devices for operating the said arms or supports and form at the proper time and to the desired extent, the said devices being shown as under the control of a foot-lever or treadle. The clamps for each edge of the corset, instead of being made as long bars, as in my Patent No. 265,963, are divided into several independent clamps controlled by a spring or weight, so as to equally distribute the strain upon all parts of the corset, notwithstanding its varying size, and to enable the strain on the corset from edge to edge to be more or less or a measured quantity, so that when operating the treadle or lever to move the form the strain exerted by the form within the corset will be measured by a spring or springs. I have also so supported the form that it may be moved endwise, as the strain on the corset is greater at one than at its other end.

My invention consists in apparatus hereinafter described, and specifically claimed at the end of this specification, the same entering into a corset-shaping machine essentially as herein set forth.

Figure 1 represents in side elevation a corset-shaping apparatus embodying my invention, and Fig. 2 an end view thereof.

The form A, preferably hollow and of cast metal shaped to resemble the breasts, waist, and hips of a person, and mounted loosely upon arms or supports $t\ t^2$, to be described, has longitudinal grooves or recesses $a\ a$ at its under side, near each end, which receive the anti-friction rollers $a^2$, having their axles or centers at $a^3$, there being, as herein shown, one such roller on the said arms or supports, to obviate friction as the said arms or supports are moved to force the form into the corset. The said rollers are shown as beveled at their edges, to enable them to act as guides for the form as it is moved longitudinally, and also to restrain the form from lateral movement on the arms or supports, by which it is raised and lowered. The arms or supports $t\ t^2$ are connected at their ends with shafts or axes 2, suitably mounted in the frame-work B of the machine, and to these shafts or axes, and so as to move the arms $t\ t^2$, are arms or levers $b\ b'$, one of the said arms $t$ or $t^2$ and a shaft or axis, 2, and one of the arms $b$ or $b'$, as shown, constituting a rock-shaft having arms extended in different directions. The arms $b\ b'$ at their free ends are connected with a treadle or lever, $e$, pivoted at 4 by actuating devices, (shown as three links, $c, c'$, and $d$,) the said devices being so joined and arranged as to simultaneously move the arms or supports $t\ t^2$ and the opposite ends of the form upward or downward. The weight of the form resting on the arms $t\ t^2$, acting on the arms $b\ b'$ and links, keeps the lever $e$ elevated, as in full lines. The main frame-work B, held together by means of suitable braces, has a guide-plate, $j$, provided with holes to receive and guide the clamp-carriers $h$. These carriers $h$ are herein shown as bent rods having collars $i$ attached thereto to determine the descent of each clamp-carrier and its attached clamp or corset-holding device $f$, the latter, as herein shown, being composed of two jaws provided with a suitable adjusting device, which may be either a screw, as shown at 6, or a slide, as shown at 7, or other suitable and well-known equivalents therefor, the adjusting device enabling the jaws of the clamps to be closed firmly upon the eyeleted edges of the corset laid over the form, the outer edges of the halves of the corset being suitably hooked or fastened together. The carrier-rods $h$ are provided with a series of weights, $k$, more or less, in accordance with the amount of strain to be put upon the corset by the clamp and carrier acted upon by the said weight.

Instead of the weights, I might employ as an equivalent a spring, as at $m$ in dotted lines, placed on the carrier between a pin, $n$, and the under side of the cross-beam C, as in Fig. 1; but I prefer the weights.

The corset is not shown.

With the parts as in full-line position, Figs. 1 and 2, the clamps will be opened, the eyeleted edges of the corset will be placed in and clamped between the jaws thereof, and the operator will place his foot upon the lever $e$, pushing it down, as in dotted lines, which movement through the links $d$ and $c\ c'$ will turn the supports $t\ t^2$, as indicated in dotted lines, lifting the form, (preferably suitably heated by the introduction of steam, hot water or hot air, or by gas,) and will carry the corset up with it. As the form and corset are lifted the weights on the clamp-carriers gradually act to take up the slack in the corset, drawing and fitting it closely about the form, and, finally, the carriers and their weights are lifted so high by the corset engaged by the clamps that the series of weighted carriers are suspended from the corset, each acting on different portions of the corset to stretch it in proportion to the weight on the carrier.

Corsets taper from the breast and hip covering portions toward the waist. Should a corset stretch more near one than near its other end, and one end of the form be lifted while its other end was held down, the corset would be stretched unequally and the supports and weight would throw the form off. To obviate this the supports have been provided with rollers $a^2$, and as the form is being lifted, if one part of the corset bears harder on the inclined faces of the form than is right for the correct operation of the parts, such excess of strain will cause the form A to move longitudinally for a suitable distance, to enable the part of the corset of least diameter to find its proper place upon the form.

The broad invention herein set forth is covered in my application filed April 23, 1883, No. 92,634, and said application also embraces the form of press shown but disclaimed in favor of said application No. 92,634 in my application filed September 21, 1883, No. 107,025.

I claim—

1. In a corset-shaping machine, the form and devices for holding the corset, combined with the vibrating arms or supports for the form to move it to shape the corset, substantially as set forth.

2. In a corset-shaping machine, the form and devices for holding the corset over the form, combined with the movable arms or supports for the form, and with rollers upon which the form rests loosely, substantially as described.

3. In a corset-shaping machine, the form and devices to hold the corset over the form, and movable rollers on which the form rests loosely, and by which it is raised at or near each end, combined with means to move the said rollers up and down to raise the form and press the same into the corset, substantially as described.

4. In a corset-shaping machine, the form and devices to hold the corset over the form, and arms or supports for the form near its ends, combined with devices for moving the said arms upward to force the mold into the corset, substantially as described.

5. In a corset-shaping machine, the form and suitable frame-work, combined with two arms or supports having their axes in the said frame and located at each end of the said frame, and devices for turning the said arms or supports with relation to their axes to move the mold upward, substantially as described.

6. In a corset-shaping machine, the form provided with grooves or recesses at its under side, and devices to hold the corset about the form, combined with arms or supports through which the form is supported near each end and prevented from being moved laterally, substantially as described.

7. In a corset-shaping machine, the form, arms, or supports for each end of the same, and on which the form is placed loosely, combined with arms $b\ b'$, connected with the axes of the arms or supports for the form, and with links attached to the arms $b\ b'$, and with a connected treadle or lever to actuate the arms $b\ b'$ and move the form, substantially as described.

8. In a corset-shaping apparatus, a hollow form and four arms or supports upon which the said form is placed loosely, two at or near each end, combined with means to turn the said arms or supports and raise and lower the form, and with devices to clamp and hold the edges of the corset, substantially as described.

9. In an apparatus for shaping corsets, a form and a movable support on which it is mounted, and by which the form is raised and lowered, combined with a series of clamps and carrier-rods provided with weights to act upon the corset when the form is elevated by the supports, substantially as described.

10. In an apparatus for shaping corsets, a form and arms to support and raise and lower the same, and rollers interposed between the said supports and form, combined with a series of clamps, clamp-carriers, and weights to act upon a corset and stretch it over the form as the latter is lifted, the form being free to turn longitudinally under unequal strain of the corset upon it, substantially as described.

11. In an apparatus for shaping corsets, the form, the arms or supports $t\ t^2$, the links $c\ c'$, and connecting-rod $d$, and a lever to move it, combined with the clamps, clamp-carriers, and weights, as and for the purposes set forth.

In testimony whereof I have signed my name to this specification in the presence of two subscribing witnesses.

JAMES ALFORD HOUSE.

Witnesses:
HENRY W. GILBERT,
JAMES CARR.